Jan. 12, 1960 D. L. JAFFE 2,921,306

MOBILE RADIO LOCATOR

Filed Jan. 16, 1957 3 Sheets-Sheet 1

INVENTOR.
D. LAWRENCE JAFFE
BY Darby & Darby
ATTORNEYS

Jan. 12, 1960 D. L. JAFFE 2,921,306

MOBILE RADIO LOCATOR

Filed Jan. 16, 1957 3 Sheets-Sheet 2

INVENTOR.
D. LAWRENCE JAFFE
BY Darby & Darby
ATTORNEYS

INVENTOR.
D. LAWRENCE JAFFE
BY Darby & Darby
ATTORNEYS 2,921,306

MOBILE RADIO LOCATOR

David Lawrence Jaffe, Great Neck, N.Y., assignor to Polarad Electronics Corporation, Long Island City, N.Y., a corporation of New York Application January 16, 1957, Serial No. 634,458

8 Claims. (Cl. 343—112)

The present invention relates to a mobile radio locator device and more particularly to a radio locator which requires only a single mobile receiving station and includes means for automatically computing the map coordinates of the location of a radio transmitter being received by the radio locator device.

It is frequently desired that the location of a distant radio transmitter be ascertained, particularly in the course of military operations. A standard method of determining the location of a distant radio transmitter consists of determining the approximate angle of the transmitter from two spaced reception points by means of directional radio antennas and associated radio receivers. If the approximate angle between each of two known points and the radio transmitter has been determined, the approximate position of the radio transmitter may readily be determined by triangulation.

As a practical matter the direction of a radio transmitter from a receiver can be determined with only a moderate degree of accuracy and hence the azimuth angles in the triangulation problem cannot normally be determined with an error of less than approximately one degree. When there is a considerable possible error in the determination of the azimuth angles to the transmitter, it is obvious that the base line extending from one receiving point to the other cannot be short compared with the distance to the transmitter from the base line, since otherwise a prohibitively large resultant error in the location of the radio transmitter may occur.

Thus it may be seen that while optical range finders and other triangulation devices may have a short base line compared to the distance to the object to be measured, radio locators utilizing triangulation techniques must have widely separated receiving stations to provide a long triangulation base line if large errors are to be avoided.

The most common method of providing a radio locator system using triangulation techniques involves two receiving stations with directional antennas spaced at a considerable distance. Due to the required large distance between stations as just explained, wire or radio communication is necessary between the receiving stations of such a system. Since the distance involved would often be several miles or more, the installation of wire communications between systems requires a large expediture of time and effort which substantially reduces the effectiveness and flexibility of the radio location scheme. Radio communication between receiving stations is subject to interception or interference and may disclose the position of the receiving stations. Failure of either radio or wire communication would of course render the two-station triangulation system completely useless.

The present radio location device overcomes the difficulties inherent in a two-station triangulation system and provides a rapid and flexible radio location system, by utilizing only a single mobile receiving station so that no communication is required between separate receiving stations. The use of a single receiving station also represents a saving of radio-receiving equipment of fifty percent. In addition, the present radio locating system is mobile and requires a minimum of time for establishing operation.

It is therefore an object of the present invention to provide a radio locating system with only one receiver for ascertaining the location of a remote radio transmitter.

It is another object of the present invention to provide a mobile radio location device having a position computer for continuously computing the position of the vehicle in which the radio equipment is transported.

It is a further object of the invention to provide a mobile radio locating device having a computer for solving the triangulation problem required to ascertain the location of a radio transmitter.

It is a still further object of the present invention to provide a mobile radio locator device having a position computer and a triangulation computer which operate at different times and hence some of the components may be used in both computers.

Other objects and advantages will be apparent from a consideration of the following description and conjunction with the appended drawings, in which Fig 1 is a diagram illustrating the geometric relations of the locator and the transmitter, and the method used to solve the triangulation problem;

Figure 1:
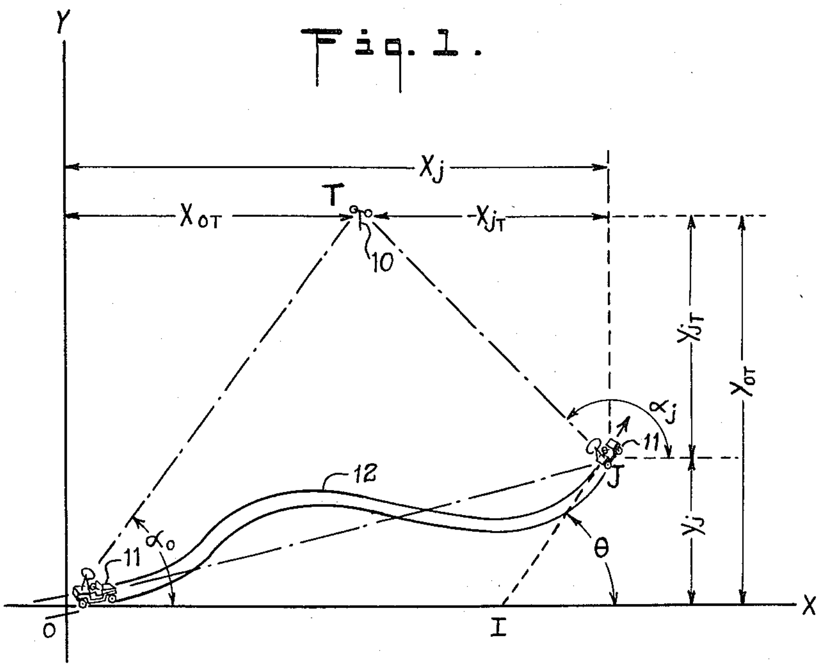

Referring now to the drawings and particularly to Fig. 1, there is shown a diagram having a coordinate system defined by the X and Y axes (OX and OY). At a point T on the diagram there is shown schematically an antenna 10. The antenna 10 represents a radio transmitter, the position of which it is desired to determine by a radio locating device according to the present invention.

A vehicle having a radio locating device installed therein is shown at 11. The vehicle 11 is shown located at the point O, the assumed origin of the coordinate system. In the course of operation of the mobile locating device, the vehicle 11 will move along any desired path, such as the curved path 12 until it reaches the position J as shown by the representation of the second vehicle position 11'. The path 12 may be straight or curved, being shown curved for full generality.

The angle between the X axis and the line OT is designated $\alpha_0$. The angle between the X axis and the line JT is designated $\alpha_j$. The direction of travel of the vehicle at position 11' is represented by the dotted arrow IJ. The angle between the direction of vehicle travel (for example, IJ) and the X axis is indicated by the angle $\theta$.

The starting position O of the mobile radio locator is known and the radio locator device includes a position computer for automatically computing the relative position of the second triangulation point J. The radio locator also includes a radio direction-finding receiver for determining the angles $\alpha_0$ and $\alpha_j$. Thus it may be seen that two angles $\alpha_0$ and $\alpha_j$ and the included side OJ of the triangle OJT are known and therefore the location of the point T is fully defined and may be calculated. The radio locating device includes a transmitter location computer for computing the X and Y coordinates of the vertex T of the triangle OJT and hence computing the location of the transmitter 10. The structure and function of these various elements will be described in detail below.

Figure 2:
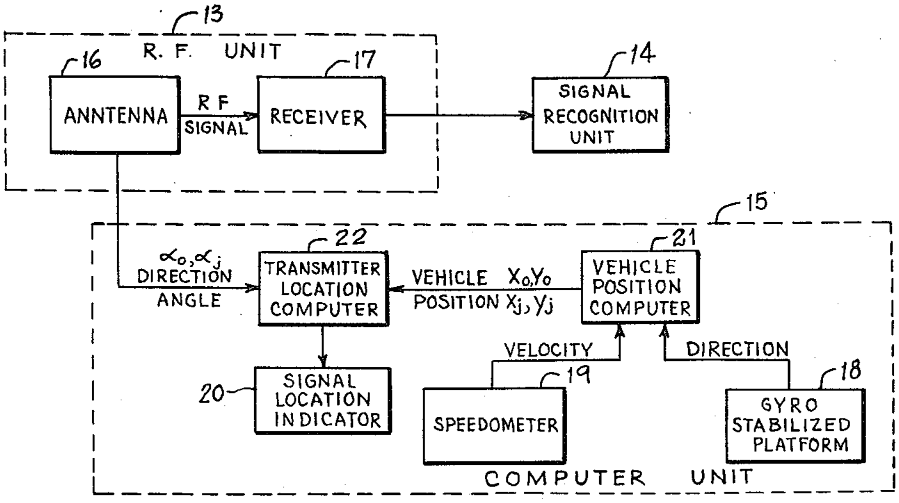
Fig. 2 is a block diagram of a radio locator device according to the present invention.

Fig. 2 shows a block diagram of the major components of the radio locating device. The radio frequency unit 13 of the device is shown enclosed in dotted lines. This unit consists of a directional receiving antenna 16 connected to a receiver 17. In addition to the directional antenna 16, an omni-directional antenna may be provided for the purpose of monitoring or tracking a distant transmitter without the necessity for adjusting the directional antenna to the direction of the distant transmitter.

The output of the microwave receiver 17 is fed to a signal recognition unit 14 which enables the operator to identify the signal from a particular transmitter in the presence of the numerous radio signals. Although the radio frequency unit 13 is illustratively considered to be a micro-wave-frequency unit, the invention is not limited to radio locators for microwave frequencies but may be used at other frequencies as well. In fact, elements and principles of the system may be adapted for use in locating sources of electromagnetic radiation outside of the radio-frequency spectrum, such as heat sources or light sources.

The computer unit 15 of the radio locator device is also shown enclosed in dotted lines. The computer unit 15 includes a speedometer 19 for determining the velocity of the vehicle 11 in which the mobile radio locator is transported. The computer unit 15 also contains a gyro stabilized platform 18 which furnishes information determining the orientation of the vehicle with respect to the X and Y axes shown in Fig. 1 and also with respect to the vertical axis.

The outputs of the speedometer 19 and platform 18 are supplied to a vehicle position computer 21 which computes the X and Y coordinates of the position of the vehicle with respect to the starting point O in a manner which will later be described.

The X and Y coordinates of the vehicle position are fed from the vehicle position computer 21 to a transmitter location computer 22. The azimuth angles $\alpha_0$ and $\alpha_j$ to the point T from the starting point O and the second point J are supplied to the transmitter location computer 22 from the directional antenna 16. Thus given the coordinates $X_0$, $Y_0$ and $X_j$ and $Y_j$ of the triangulation points O and J and the azimuth angles $\alpha_0$ and $\alpha_j$, the transmitter location computer computes the coordinates of the point T and hence of the distant transmitter 10. The signals representing these coordinates are fed to a signal location indicator 20. The detailed structure and function of the vehicle position computer 21 and transmitter location computer 22 will be described in connection with Figs. 4 and 5 below.

Although the radio locator device has been described as installed in a land vehicle, it is obvious that the radio locator with slight modifications could be installed in a water vehicle or an aerial vehicle with equal facility. In the event that it may be desired to install the radio locator in other than a land vehicle, it would of course be necessary to provide a suitable velocity-measuring device to replace the speedometer 19.

Figure 3:
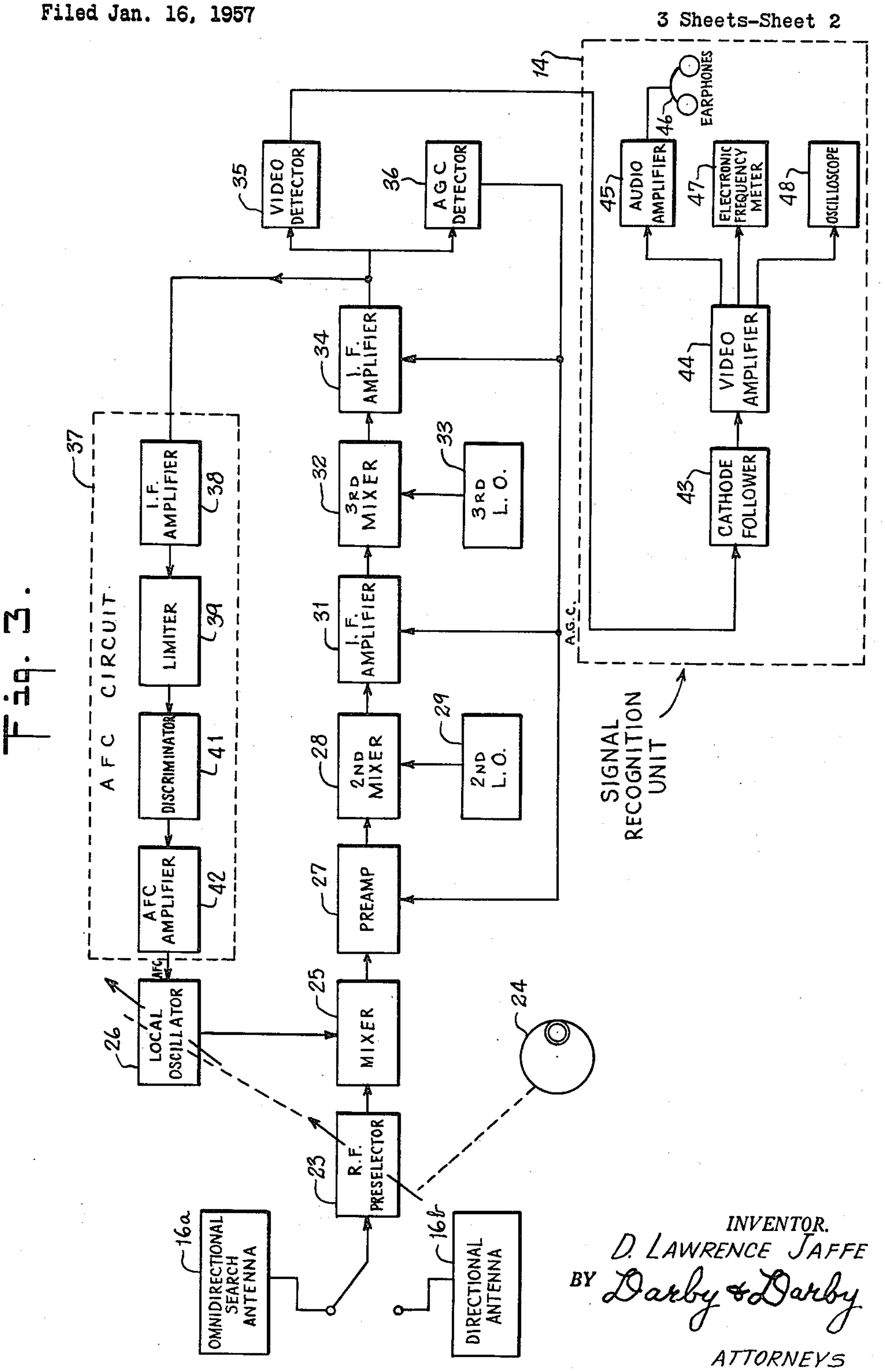
Fig. 3 is a block diagram of the monitor and direction finding radio receiver circuit of the system of Fig. 2.

Fig. 3 shows a block diagram of a preferred form of radio frequency unit 13 and signal recognition unit 14 of the radio locator device. The radio frequency unit shown in Fig. 3 is provided with two antennas, an omni-directional search antenna 16$^a$ and a directional antenna 16$^b$. These may be of any known types. It may be desired to provide a radio locator device adapted to cover an extended microwave frequency range (for example, from 1000 to 11,000 megacycles). In such a case interchangeable antennas and receivers may be provided for covering the range in frequency steps, for example, in four bands. A single vehicle 11 could readily carry equipment for all four bands (thus covering the frequency range from 1000 to 11,000 megacycles) and provision could be included for instantaneously switching from one frequency band to another. Although the invention is not limited to the use of particular types of antennas, it is preferred that the omni-directional search antenna be of the bi-conical or disk-cone type, thereby giving excellent broad-band operation and uniform omni-directional response pattern. It is also preferred that the directional antenna consist of a reflecting surface and a waveguide feed utilizing slot antennas. Use of these antennas allows the 1000 to 11,000 megacycle frequency range to be covered by only four different antennas.

The RF unit 13 of the radio locator is provided with an RF preselector 23 connected to receive the signal from one or the other of the antennas **16*a* and 16*b*. The RF preselector is preferable but not necessarily of the multicavity type in order that spurious responses will be rejected in the receiver circuit. A local oscillator 26 and the RF preselector 23 feed a mixer 25 to generate the first intermediate frequency in the receiver section. The local oscillator 26 is preferably of the externally tuned reflex klystron type. The tuning drives for the preselector and local oscillator may be all mechanically connected and driven by a single tuning knob 24** so that single-knob tuning is provided for the receiver.

A preamplifier stage 27 amplifies the output of the mixer 25. The output of the preamplifier 27 is fed into a second mixer 28 which is fed by a second local oscillator 29. An IF amplifier 31 amplifies the second IF output of the mixer 28 and feeds a third mixer 32. The third mixer 32 is also fed by a third local oscillator 33. A final IF amplifier 34 amplifies the third IF output of the third mixer 32.

The output of the third IF amplifier 34 is fed to both a video detector 35 and an automatic gain control detector 36. The output of the automatic gain control detector is fed back to control the preamplifier 27, the IF amplifier 31, and the IF amplifier 34.

The RF unit is also provided with an automatic frequency control circuit 37 shown enclosed in dotted lines in Fig. 3. The AFC circuit 37 includes an IF amplifier 38 coupled to the output of amplifier 34, a limiter 19 connected to the output of the IF amplifier 38 for eliminating amplitude modulation of the signal, and a frequency discriminator 41 connected to the output of the limiter 39 for detecting frequency variations in the signal. An automatic frequency control amplifier 42 is connected to receive the frequency error signal from the discriminator 41. The amplified output of the AFC amplifier 42 is fed to the local oscillator 26. The klystron local oscillator 26 is repeller voltage tuned in known manner by the automatic frequency control signal to automatically correct for deviations in the signal frequency.

A signal recognition unit 14 is shown enclosed in dotted lines in Fig. 3. The signal recognition unit 14 contains a cathode-follower stage 43 coupled to the output from the video detector 35 of the receiver, and a video amplifier 44 coupled to stage 43 for amplifying the signal in order to drive various indicating devices.

The output of the video amplifier 44 is connected through an audio amplifier 45 to earphones 46. The magnitude of the received signal is thus indicated to the operator by the signal in the earphones 46 and hence facilitates adjustment of the directional antenna **16*b* to maximum reception. In addition the audible signal from the earphones 46** may assist the operator in identifying the signal from a particular transmitter.

An electronic frequency meter 47 is also connected to the video amplifier 44 so that the operator is provided with frequency information concerning any low-frequency modulation of the received signal.

Further information is provided by an oscilloscope 48 connected to the video amplifier 44 to aid in identifying a particular signal. The oscilloscope provides the operator with information concerning duty factor, type of modulation, and noise present in the received signal. Thus it may be seen that the radio frequency unit 13 and the signal recognition unit 14 of the radio locator enable the operator to select a signal from a particular transmitter and to adjust the directional antenna **16*b*** for maximum signal in order to ascertain the direction of the transmitter from the point at which the mobile radio locator is located.

Although a preferred type of radio receiver unit 13 and signal recognition unit 14 has been described above, the invention is not limited to the use of these particular devices and any directional signal detector could be employed in accordance with the invention. For example, the directional receiver may include means for automatically rotating the directional antennae to track a radio signal, or the receiver might be provided with a continuously rotating antenna with a phase detector or the like for determining the azimuth angle of the signal being received.

Figures 4, 5:
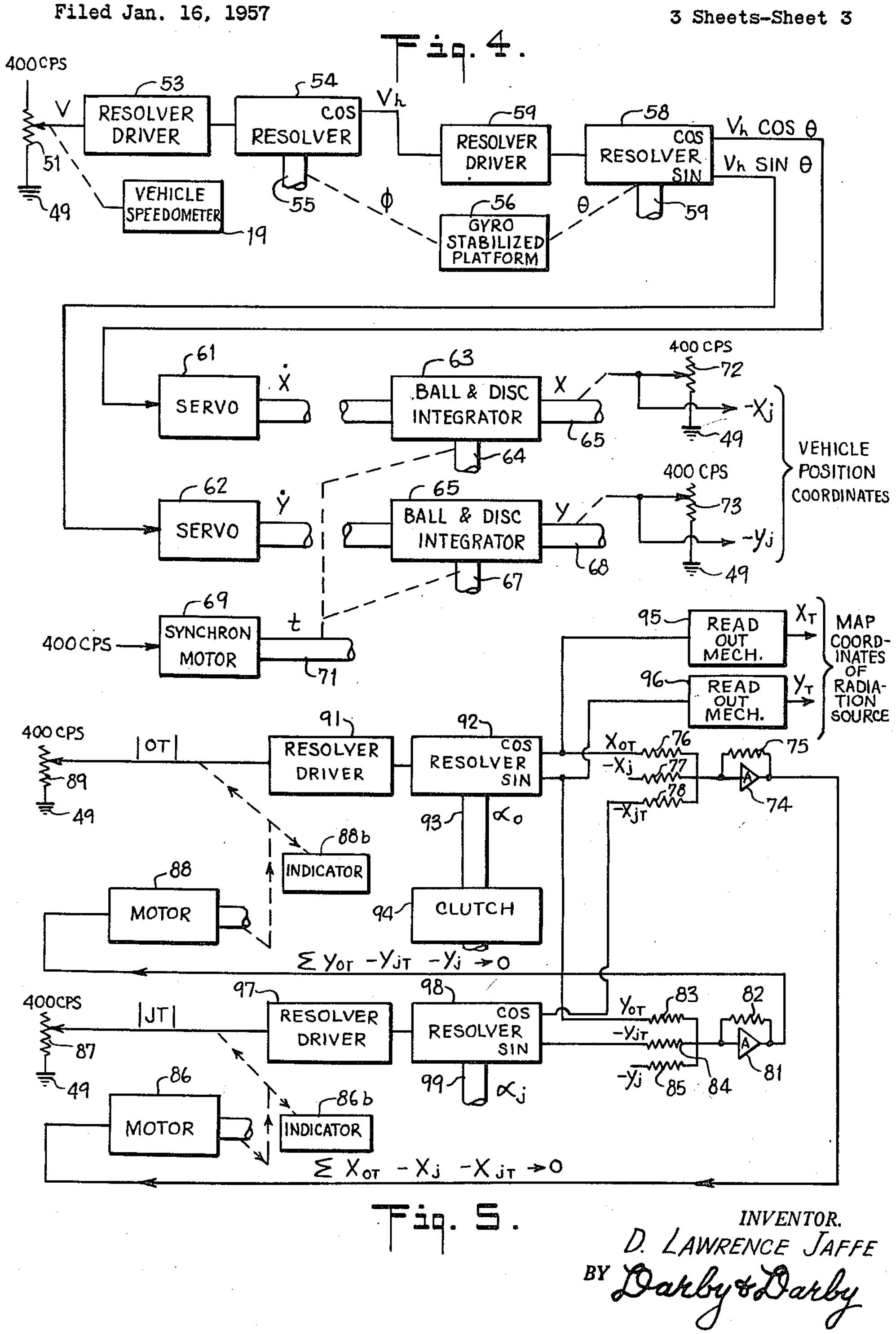
Fig. 4 is a block diagram of the vehicle position computing component of the radio locator device of Fig. 2.
Fig. 5 is a block diagram of the transmitter location computing component of the radio locator device of Fig. 2.

Figs. 4 and 5 show the computer units 21 and 22 of the mobile radio locator device. Fig. 4 shows the vehicle position computer 21. A potentiometer 51 is connected between an A.C. power supply (such as 400 cycles per second) and ground 49. The adjustable tap of the potentiometer 51 is driven by the vehicle speedometer 19 so that an alternating current potential is provided at the adjustable tap of the potentiometer 51 which is proportional to the velocity of the vehicle 11 in which the mobile radio locator is installed. This signal from the adjustable tap of the potentiometer 51 is fed through a resolver driver amplifier 53 to a resolver 54. The resolver driver acts as a buffer amplifier and prevents loading of preceding stages. The resolver 54 is adapted to receive an electrical input signal and a mechanical input signal (such as a shaft displacement angle) and to provide an output signal which is equal to the electrical input signal multiplied by a trigometric function of the angle represented by the mechanical input signal, such as its cosine. (Information concerning the design and operation of resolvers may be obtained by reference to Analog Methods in Computation and Simulation, Walter Soroka, McGraw-Hill 1954, pp. 88–93.) A resolver useful here may consist of a transformer excited by the electrical signal having a primary and secondary which are relatively rotatable by the mechanical signal, for example, or alternatively a potentiometer with a non-linear winding may be used. Of course, any other equivalent device may be used as well.

The mechanical input 55 of the resolver 54 is driven by a gyro-stabilized platform 56. A gyro stabilized platform provides a reference which is stabilized relative to all three space axes so that the relative angular orientation of the vehicle 11 with respect to the spatial axes is supplied by the gyro stabilized platform. Such stabilized platforms are known and need not be described in detail here. The resolver 54 is connected to the gyro stabilized platform 56 so that the mechanical input 55 to the resolver 54 is proportional to the angle $\phi$, the angle $\phi$ being the angle of the vehicle orientation and direction of travel with respect to the vertical axis.

The resolver 54 is adapted to have an output $V_h$ which is proportional to the vehicle velocity V times the cosine of the angle $\phi$. Hence the output of resolver 54 is equal to the horizontal component $V_h$ of the vehicle velocity. In many cases the mobile radio locator will be operated in hilly terrain and hence moves up and down through a considerable vertical distance in the course of traversing the horizontal distance between point O and J, the two triangulation points in Fig. 1. Resolver 54 assures that only the horizontal component of the vehicle velocity contributes to the position-computing section and hence no error in the distance between triangulation point is introduced by reason of up and down vertical movements in hilly terrain.

The output of the resolver 54 is fed through a resolver driver or buffer amplifier 59 to a second resolver 58. Resolver 58 is similar to the resolver 54 except that it is provided with both a cosine and a sine output. The mechanical input 59 of resolver 58 is also connected to the gyro-stabilized platform 56. However, the input 59 of the resolver 58 is connected to receive the angular deviation $\theta$ of the vehicle orientation with respect to the horizontal X axis. The resolver 58 therefore provides an output $V_h \cos \theta$ and output $V_h \sin \theta$ which are respectively equal to the X and Y components of the horizontal vehicle velocity $V_h$. The cosine output of the resolver 58 is fed to an X-component servomotor 61, and the sine output of the resolver 58 is fed to a Y-component servomotor 62. The term servomotor will be used in this specification to include any device for producing a mechanical displacement in response to and corresponding to an electrical signal. Each of the servomotors 61 and 62 is electrically connected to produce a mechanical displacement substantially proportional to the magnitude of its electrical input signal. This may be accomplished, for example, in conventional manner, by a sensing device on the output shaft with a feedback control loop to balance the input signal.

The servomotor 61 provides a mechanical shaft position output which is proportional to the X-component, $\dot{X}$, of the vehicle velocity $V_h$. The output of the servomotor 62 is similarly proportional to the Y-component, $\dot{Y}$, of the vehicle velocity $V_h$. An integrator 63 such as of the ball and disk type is connected to receive the mechanical output of the X servo 61. A similar integrator 66 is connected to the Y servo 62. The disk inputs 64 and 67 of the integrators 63 and 66 are both driven by a constant speed motor 69 such as a synchronous motor. The shaft 71 of the motor 69 has a position which varies directly and uniformly with time. Hence the integrators 63 and 66 integrate inputs X and Y respectively with respect to time. Since $\int \dot{X}\,dt = X$ and $\int \dot{Y}\,dt = Y$, the outputs 65 and 68 of the integrators 63 and 66 respectively are at all times proportional to the X coordinate and the Y coordinate of the vehicle 11 with respect to their origin O as shown in Fig. 1.

Although a preferred embodiment utilizing servomotors and mechanical ball and disk integrators is shown for integrating the X and Y velocity components to obtain X and Y coordinates, it should be understood that electronic integrating amplifiers or any other equivalent means of integrating the velocity signals to obtain a displacement signal might be used. The output shaft 65 of the integrator 63 is connected to drive the adjustable tap of a potentiometer 72. Potentiometer 72 is connected between an alternating current source and ground 49. The output at the tap of the potentiometer 72 is therefore proportional to $X_j$ as shown in Fig. 1. The potentiometer 72 is connected so that its output is of a given polarity (for example, negative) with respect to other signals in the computer system (called positive). This output is preferred to be negative in order that it may be directly utilized in the transmitter location computer as will later be explained.

The output 68 of the Y-component integrator 66 is similarly connected to the adjustable tap of a potentiometer 73, the potentiometer 73 being connected between the A.C. voltage source and ground 49. As was the case with the potentiometer 72, the potentiometer 73 is connected to give a "negative" output. The output of the potentiometer 73 is proportional to the Y-component of the vehicle position coordinates, $Y_j$.

Thus it may be seen that a computer is provided which automatically and continuously computes the coordinates of the position of the vehicle 11 in which the radio locator is installed. It should be understood that while certain portions of the vehicle position computer have been shown as mechanical analogue computing elements and others have been shown as alternating current electrical analogue computing elements, equivalent or other direct current, alternating current, electro-mechanical computing elements might be substituted for performing each of the various functions of the vehicle position computer described above.

Fig. 5 shows the transmitter location computer 22. Preliminary to a discussion of the actual structure of the transmitter location computer 22, it will be helpful to outline the general theory of operation of this computer.

The transmitter location computer 22 makes use of the mathematical principle that the vector sum of the vectors comprising a closed triangle as shown in Fig. 1 must always be equal to zero. From this it follows that the algebraic sum of the X-components of such vectors must be equal to zero and also the sum of the Y-components of such vectors must be equal to zero.

The triangulation computer shown in Fig. 5 utilizes two summing amplifiers to produce the sums of the X and Y components respectively of the three vectors forming the closed triangle. As previously explained, the output of each of these amplifiers should be zero to produce a correct solution of the triangulation problem. To achieve this result any output signal (error signal) from each amplifier is fed to a respective motor to correct the values of the signals representing the unknown sides of the triangle until the value of the unknown sides is such as to produce zero outputs for both the X-component summing amplifier and the Y-component summing amplifier.

The X-component summing amplifier is shown schematically at 74 in Fig. 5. The amplifier 74 has a feedback resistor 75 and three inputs with respective input resistors 76, 77 and 78 so that the output of the amplifier 74 is proportional to the sum of the inputs at the three input resistors 76, 77 and 78.

The input signal supplied to the resistor 76 corresponds to $X_{ot}$, the X component of the side OT of the triangulation triangle OJT. The signal $X_{ot}$ is produced at the cosine output of a resolver 92 in a manner described below. The input signal supplied to the resistor 78 corresponds to $-X_{jt}$, the negative of the X component of the side JT of the triangulation triangle OJT. The signal $X_{jt}$ is produced at the cosine output of a second resolver 98 in a manner to be described below. The input signal supplied to the resistor 77 corresponds to $-X_j$, the negative of the X component of the side OJ of the triangulation triangle OJT. This signal therefore represents the negative of the X coordinate of the vehicle position and thus may be obtained from the X-coordinate output potentiometer 72 of the vehicle position computer 21 as shown in Fig. 4.

The three input signals to the resistors 76, 77 and 78 are summed by the amplifier 74 to produce an amplifier output corresponding to the expression:

$$\Sigma X_{ot}-X_j-X_{jt}$$

The operation and structure of such summing circuits is well known in the art (see Analog Methods in Computation and Simulation, Walter W. Soroka, McGraw-Hill 1954, pp. 44–46) and any one of the many such circuits would be suitable to perform the summing function in the triangulation-type transmitter position computer.

While the summing operation in the device shown in Fig. 5 is accomplished electrically, it should be understood that any other summing devices, such as mechanical differential gear arrangements, for example, could be substituted to sum the X and Y components of the three vectors representing the sides of the triangulation triangle.

The Y-component summing circuit of the computer is similar to the X-component summing circuit. The Y-component summing amplifier is shown at 81. The amplifier 81 has a feedback resistor 82 and three input resistors 83, 84 and 85 operating in a manner similar to those in the X-component summing circuit previously explained.

The input signal supplied to the resistor 83 corresponds to $Y_{ot}$, the Y-component of the side OT of the triangulation triangle OJT. The signal $Y_{ot}$ is produced at the sine output of a resolver 92 as described below.

The input signal supplied to the resistor 84 corresponds to $-Y_{jt}$, the negative of the Y component of the side JT of the triangulation triangle OJT. The signal $Y_{jt}$ is produced at the sine output of a resolver 98 in a manner described below. The input signal supplied to the resistor 84 corresponds to $-Y_j$, the negative of the Y component of the side OJ of the triangulation triangle OJT. The signal $-Y_j$ is equal to the negative of the Y coordinate of the vehicle position and is obtained from the output potentiometer 73 of the position computer 21 shown in Fig. 4.

The three input signals to the resistors 76, 77 and 78 are summed by the amplifier 74 to produce an amplifier output corresponding to the expression $$\Sigma Y_{ot}-Y_j-Y_{jt}$$

The output of the X component summing amplifier 74 is fed to a motor 86 which is connected to drive the movable tap on a potentiometer 87. It should be noted that the motor 86 is electrically connected so that the rotational displacement of its output shaft has a direction determined by the phase or polarity of the input signal. The function of the motor 86 is therefore somewhat different from that of servomotors 61 and 62 in that repeat-back is provided externally through the other parts of the system.

The potentiometer 87 is connected between the A.C. source and ground so that a variable alternating voltage signal is generated at the movable tap of the potentiometer 87 in accordance with the physical position of the tap. Thus the value of the signal generated at the top of potentiometer 87 is respectively increased or decreased by positive or negative signals applied to drive the motor 86 in one direction or the other. When no signal is applied to the motor 86, the signal output from potentiometer 87 remains constant.

The Y component summing amplifier 87 has its output connected to a second motor 88. Motor 88 drives the movable tap on the potentiometer 89 which is connected between the alternating voltage source and ground 49. The operation of the motor 88 and potentiometer 89 is similar to that of servo 86 and potentiometer 87 previously described.

The potentiometer 89 is connected through a resolver driver amplifier 91 to a resolver 92. Resolver 92 has a mechanical input 93 connected to be positioned to an angle corresponding to the azimuth angle from the first triangulation point O to the distant transmitter location T. This angle is determined at the beginning of the triangulation run of the vehicle. Hence a clutch 94 is provided to drive the resolver mechanical input 93 so that the angle $\alpha_o$ may be set or stored in the computer at the beginning of the run and disconnected by disengaging the clutch 94. Therefore future variations in the angle $\alpha_o$ do not vary the setting of the resolver 92 since resolver 92 has been disabled by disengagement of the clutch 94.

The resolver 92 has both a sine and cosine output. The cosine ouput (shown below to be $X_{ot}$) of the resolver 92 is connected to the input 76 of the X component summing amplifier 74 while the sine output (shown below to be $Y_{ot}$) of the resolver 92 is connected to the input 83 of the Y component summing amplifier 81.

The potentiometer 87 is similarly connected through a resolver driver amplifier 97 to a resolver 98. Resolver 98 has a mechanical input 99 adapted to be positioned in accordance with the azimuth angle from the second triangulation point J to the transmitter location T. This angle is designated $\alpha_j$ in the diagram of Fig. 1.

It will be noted that in the case of the resolver 98 the clutch may be omitted and the mechanical input of the resolver 98 may be driven directly from the direction finding antenna. There is no necessity for storing the angle $\alpha_j$ since the determination of the angle $\alpha_j$ is made at the end of the triangulation run and the results of the triangulation computation will be immediately available.

The resolver 98 has both a cosine and a sine output. The negative cosine output (shown below to be $-X_{jt}$) of the resolver 98 is connected to the input 77 of the X component amplifier 74 and the negative sine output (shown below to be $-Y_{jt}$) of the resolver 98 is connected to the input 84 of the Y component amplifier 81.

For simplicity, the inputs to the input resistors 77 and 85 of the summing amplifiers 74 and 81 respectively, have been omitted. The signal inputs $-X_j$ and $-Y_j$ for the resistors 77 and 85 are obtained from the output potentiometers 72 and 73 in Fig. 4.

As will now be shown, the signal produced by the potentiometer 87 will be equal to the absolute value of the vector JT from the second triangulation point J to the transmitter T and the signal produced by potentiometer 89 is equal to the absolute value of OT.

This will be understood by first considering the operation of the summing amplifier 74 and the resolver 92, disregarding for the moment the operation of the reminder of the circuit. An input signal $-X_{jt}$ is assumed furnished to the amplifier 74 from another part of the circuit. A second input signal $-X_j$ is also furnished to the summing amplifier 74 by another portion of the circuit, namely, the vehicle position computer 21. A third input signal is furnished to the summing amplifier 74 from the resolver 92. This signal is labed $X_{ot}$ in Fig. 5. It has not been explained, however, why the cosine output of the resolver 92 is equal to $X_{ot}$. Therefore for the moment let it be assumed that the input to the resistor 76 is a signal, S, of unknown value.

The output of the summing amplifier 74 is maintained substantially at zero by the motor 86 which drives the potentiometer 87 in the proper sense to restore the output of the amplifier 74 to substantially zero whenever the output varies from that value. It may therefore be seen that the operation of the circuit is such that:

$$S-X_j-X_{jt}=O \tag{1}$$

therefore:

$$S=X_j+X_{jt} \tag{2}$$

Since the signal S is also the output from the cosine output of the resolver 92 then if R is the resolver electrical input:

$$S=R\cos\alpha_o \tag{3}$$

and $$R=\frac{X_j+X_{jt}}{\cos\alpha_o} \tag{4}$$

From Fig. 1 it may be seen that the quantity $X_j+X_{jt}$ (taking into consideration the fact that $X_{jt}$ in Fig. 1 is a negative quantity) is equal to the X coordinate of the point T, $X_{ot}$, and therefore:

$$X_{ot}=X_j+X_t=S \tag{5}$$

Dividing this quantity by cos $\alpha_o$ (see Fig. 1) yields the distance |OT| so that:

$$|OT|=\frac{X_j+X_{jt}}{\cos\alpha_o} \tag{6}$$

From (4) and (6), $$R=|OT| \tag{7}$$

Thus if the output of the amplifier 74 is maintained substantially at zero, the input to the resistor 76 must correspond to the quantity $X_{ot}$ and therefore the input to the resolver 92 must correspond to the distance |OT|.

Since the electrical input of resolver 92 is a signal corresponding to |OT|, then the sine output of the resolver 92 must be |OT| sin $\alpha_o$. Referring to Fig. 1, it will be seen that:

$$|OT|\sin\alpha_o=Y_{ot} \tag{8}$$

The sine output of the resolver 92 therefore corresponds to the quantity $Y_{ot}$. It has therefore been shown that each of the electrical input and output signals of the resolver 92 must correspond to a particular physical distance as indicated in Figs. 5 and 1. A similar analysis will show the same to be true of the resolver 98, whose input is |JT| and whose outputs are $-X_{jt}$ and $-Y_{jt}$.

The resolver 98 and the summing amplifier 81 operate in conjunction with the resolver 92 and the summing amplifier 74. The complete circuit therefore operates to solve two simultaneous equations for two unknowns, namely, the X coordinate and the Y coordinate of the point T at which the transmitter is located (relative to the initial triangulation point). In the solution of the problem the distance from each triangulation point to the transmitter location T is also produced as the magnitude of the output signals of the respective potentiometers 87 and 89.

Indicating devices for the X and Y coordinates of the transmitter location are shown at 95 and 96. The X and Y coordinate indicators 95 and 98 may consist of any suitable read-out mechanisms such as dial-indicating voltmeters or the like. The X coordinate indicator 95 is connected to receive the X component $X_{ot}$ of the distance OT from the cosine output of the resolver 92. It may be seen that the X coordinate of the transmitter T is thus provided with the understanding that the origin of the coordinate system is at the starting or first triangulation point and the axes established by preliminary orientation of the gyro platform. The Y coordinate indicator is connected to the sine output $Y_{ot}$ of the resolver 92 and therefore provides the Y coordinate of the transmitter location T.

In addition to the coordinate indicators 95 and 96, distance indicators 86*b* and 88*b* may be provided for indicating to the operator the distance of the transmitter from each of the triangulation points O and J. As previously explained, signals representing these distances are produced at the potentiometers 87 and 89 by the normal operation of the computer circuit. The indicator 88*b* may thus consist of a scale with a pointer mechanically linked to the movable tap of the potentiometer 89 or may consist of a revolution counter mechanically coupled to the motor 88 which drives the potentiometer 89. Any equivalent means of indicating the physical position of the tap of the potentiometer 89 could be used. Of course, the electrical output of the potentiometer 89 could also be measured on a meter properly calibrated to yield the distance OT from the first triangulation point to the transmitter location.

The indicator 86*b* may also consist of similar suitable apparatus for indicating the physical position of the tap or the magnitude of the output signal of the potentiometer 87. Any one or all of the distance indicators 88*b*, 86*b* or the coordinate indicators 95 and 96 may be provided in the transmitter location computer 22 as may be desired for a given application of the computer.

From the foregoing description it may be seen that two equations must be satisfied in order to provide the proper coordinates of the transmitter location T. These two equations involve the summation of the X components of the three triangle sides and of the Y components of the three triangle sides respectively. The computer of Fig. 5 assures that the conditions of both equations are met. Since there are only two unknowns, namely, the X and Y coordinates of the transmitter location, these unknowns may be found by the solution of two simultaneous equations. The device of Fig. 5 therefore provides a determinate system and the coordinates of the transmitter location will be provided by the read-out mechanism 95 and 96 at all times.

While the present invention has been explained with reference to rectangular or Cartesian coordinates, it is not limited to this particular type of coordinate system but may be applied to oblique coordinates, polar coordinates or other types of coordinate systems as well.

The vehicle and transmitter computers have been described essentially as analogue computers using alternating current signals. It should be understood, however, that an equivalent system could be devised using direct current signals, mechanical signals or other known techniques. In addition, many other modifications could be made within the scope of the present invention. It should be understood therefore that the scope of the present invention is not to be considered to be limited by the specific embodiment of the invention shown, but rather the scope of the invention is to be limited solely by the appended claims.

What is claimed is:

1. A mobile radio locator for determining the position of a distant radio transmitter comprising radio direction-finding means for producing signals representing the direction of said transmitter, vehicle means for moving said direction-finding means along a path from a first point to a second point, means responsive to the direction and velocity of movement of said direction-finding means at each point along said path for producing signals representing the position of said second point relative to said first point, and means responsive to said latter position signals and to said direction signals for producing signals representing the location of said transmitter relative to said first point.

2. A mobile radio locator for determining the position of a distant radio transmitter comprising a direction-finding radio receiver for producing signals representing the direction of said distant transmitter with respect to said receiver, said receiver being mounted in a vehicle, means for producing signals representing the velocity and direction of travel of said vehicle, position-computing means coupled to said signal-producing means for continuously computing from said direction and velocity signals further signals representing the relative position of said vehicle with respect to a starting position, a transmitter-location computer, means connecting said direction-finding receiver to said transmitter-location computer for supplying to said transmitter-location computer signals representing the initial direction of said transmitter from said vehicle starting point and signals representing successive directions of said transmitter from further points on the path of said vehicle, means connecting said position-computing means to said transmitter-location computer for supplying to said transmitter-location computer, said vehicle-starting point relative-position signals, said transmitter-location computer comprising means responsive to said signals from said direction-finding receiver and to said signals from said position-computing means for computing signals representing the location of said transmitter, and indicator means for indicating the signals representing location of the distant transmitter as computed by the transmitter-location computer, whereby said transmitter location computer is supplied data defining the location of the end points of a triangulation base-line and the angle from each end point to said transmitter and with this data solves the triangulation problem and computes the relative location of a distant transmitter.

3. A mobile radio locator for determining the position of a distant transmitter comprising a vehicle, a direction-finding radio receiver mounted on said vehicle for producing signals representing the direction of a distant transmitter relative to the position of said vehicle, speedometer means for producing signals representing the velocity of said vehicle, a gyro-stabilized platform having three mutually perpendicular stabilized axes, means for generating signals corresponding to the angular position of said vehicle with respect to said gyro-stabilized platform axes, position-computing means connected to said speedometer means and to said signal generating means for continuously producing from said vehicle velocity signals and said vehicle angular position signals representing the instantaneous relative position of said vehicle with respect to a starting position, a transmitter-location computer, means connecting said direction-finding receiver to said transmitter-location computer for supplying to said computer signals representing the initial direction of said transmitter from said vehicle starting point and successive directions of said transmitter from further points on the path of said vehicle, means connecting said vehicle-position computing means to said transmitter-location computer for supplying to said transmitter-location computer signals representing the position of said vehicle with respect to its starting point, said transmitter-location computer including means responsive to said direction signals and to said latter position signals for producing signals representing the rectangular coordinates of the location of said transmitter relative to said starting point, and indicator means coupled to said transmitter-location computer for indicating said rectangular coordinates signals, whereby said transmitter-location computer is effectively supplied with data on a triangulation base line and on the angle from each end point of said line to said transmitter and with this data solves the triangulation problem and computes the relative location of said distant transmitter.

4. A mobile radio locator as claimed in claim 3 further including an electronic frequency meter connected to receive the output of said radio receiver whereby received signals may be identified by the frequency of their low frequency modulation.

5. A mobile radio locator as claimed in claim 3 further including a cathode-ray oscilloscope connected to receive the output of said radio receiver whereby received signals may be identified by the shape of their low frequency modulation.

6. A mobile radio locator for determining the position of a distant radio transmitter comprising radio direction-finding means for producing signals representing the direction of said transmitter from said radio direction-finding means; a vehicle for moving said direction-finding means along a path from a first point to a second point; means responsive to the direction and velocity of movement of said direction-finding means at each point along said path for producing signals representing the position of said second point relative to said first point, the last said means comprising means for resolving said velocity to produce X axis and Y axis component velocity signals in accordance with the instantaneous direction of movement of said direction finding means and means for separately integrating said X and Y component velocity signals with respect to time to produce X and Y position signals representing the position of said second point with respect to said first point in an X—Y coordinate system; and means responsive to said latter position signals and to said direction signals for producing signals representing the location of said transmitter relative to said first point, the last said means comprising computing means for computing the position of said transmitter from the relative position coordinates of said first and second points and the directional angle of the transmitter from each of said points.

7. A mobile radio locator for determining the position of a distant radio transmitter comprising radio direction-finding means for producing signals representing the direction of said transmitter from said radio direction-finding means; a vehicle for moving said direction-finding means along a path from a first point to a second point; means responsive to the direction and velocity of movement of said direction-finding means at each point along said path for producing signals representing the position of said second point relative to said first point, the last said means comprising means for resolving said velocity to produce X axis and Y axis component velocity signals in accordance with the instantaneous direction of movement of said direction finding means and means for separately integrating said X and Y component velocity signals with respect to time to produce X and Y position signals representing the position of said second point with respect to said first point in an X—Y coordinate system; and means responsive to said latter position signals and to said direction signals for producing signals representing the location of said transmitter relative to said first point.

8. A mobile radio locator for determining the position of a distant radio transmitter comprising radio direction-finding means for producing signals representing the direction of said transmitter from said radio direction-finding means, a vehicle for moving said direction-finding means along a path from a first point to a second point, means responsive to the direction and velocity of movement of said direction-finding means at each point along said path for producing signals representing the position of said second point relative to said first point, and means responsive to said latter position signals and to said direction signals for producing signals representing the location of said transmitter relative to said first point, the last said means comprising computing means for computing the position of said transmitter from the relative position coordinates of said first and second points and the directional angle of the transmitter from each of said points.

References Cited in the file of this patent

UNITED STATES PATENTS 2,507,567 Garnier ---------------- May 16, 1950
2,710,962 Fritze ----------------- June 14, 1955